H. Miller

Soldering Cans.

No. 3575.

Reissued Aug. 3. 1869.

Witnesses.

Thos H Douglas

Geo W Reed

Inventor.

Herman Miller

UNITED STATES PATENT OFFICE.

DEVOE MANUFACTURING COMPANY, OF LONG ISLAND CITY, NEW YORK, ASSIGNEES, BY MESNE ASSIGNMENTS, OF HERMAN MILLER.

IMPROVEMENT IN SOLDERING SHEET-METAL CANS.

Specification forming part of Letters Patent No. 39,616, dated August 18, 1863; reissue No. 3,575, dated August 3, 1869.

*To all whom it may concern:*

Be it known that the following is a full, clear, and exact description of a new and useful Improvement in the "Soldering of Sheet-Metal Cans and other Vessels," the invention of HERMAN MILLER, of the city, county, and State of New York, reference being had to the accompanying drawings, forming part of this specification, in which—

Figure 1:
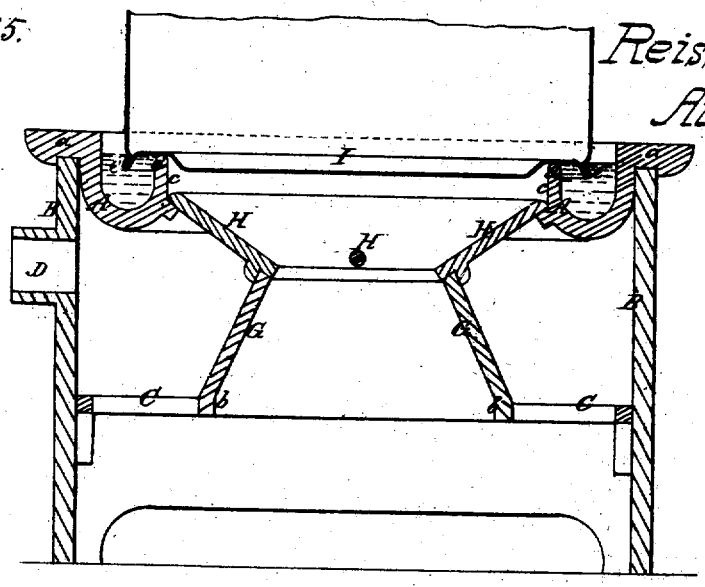
Figure 2:
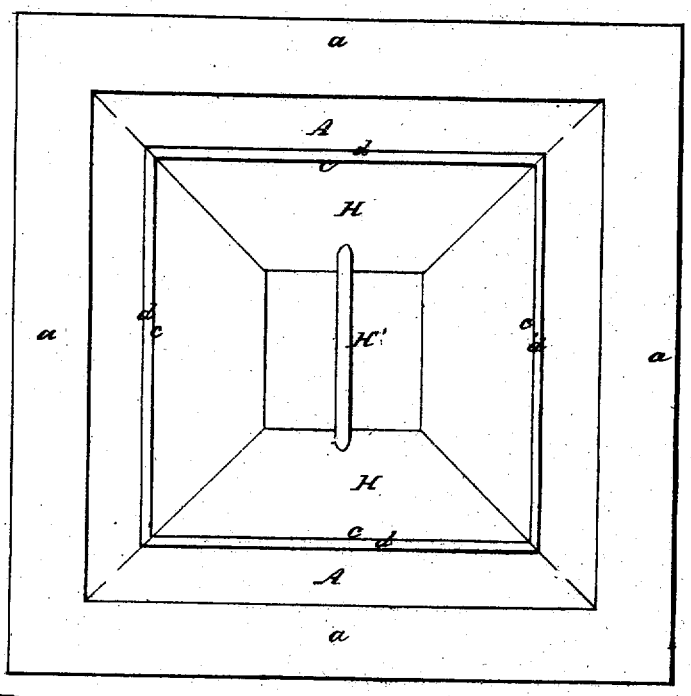

Figure 1 represents a vertical section of the apparatus employed in carrying out said invention, and Fig. 2 a plan of the same.

Similar letters of reference indicate corresponding parts in both figures.

The object of this invention is to effect the soldering of the joints of tin cans, and other vessels of sheet metal, by dipping the joint into the melted solder, by which means the soldering can be effected more expeditiously, and with a smaller quantity of solder, and the use of cheaper solder, containing a larger proportion of lead, which would not follow a soldering-iron, is permitted; and to this end the invention consists in the employment, for containing the melted solder in which the joint is to be dipped, of a pan, so constructed as to establish a soldering-channel of a shape corresponding with that of the joint to be soldered, without allowing any other portions of the can or vessel but those in immediate proximity to the joint to come in contact with the melted solder. It also consists in providing such pan, or so constructing its interior device or structure, which establishes the soldering-channel hereinbefore referred to, with a rest for the can or vessel to be soldered, to more completely protect the surface of the can not required to come in contact with the solder, and to insure the dipping of all parts of the joint in the solder to a uniform depth, or thereabout. And said invention further consists in providing a vent within said rest, and below the can, to allow of the expulsion of air in bringing down the can-joint into the melted solder, and to prevent the formation, below the can, of a vacuum when lifting the can out of the solder-pan.

To enable this mode of soldering to be successfully performed, it is desirable, if not absolutely necessary, to adopt some construction of joint which projects from the adjacent portions of the can or vessel, and it was for this purpose that the double-recessed clamping lap-joint which forms the subject of Letters Patent dated June 23, 1863, was invented, which joint is considered better adapted to the purpose than any previously known.

To enable others skilled in the art to make and use this invention, a description of the same in one of its forms or modifications will now be given by reference to the accompanying drawing.

A is a solder-pan, represented of square form; it being intended to solder at once the whole of the top or bottom joint of a square can. This can is made with a flange, *a*, around its exterior margin, to rest upon the sides of a furnace, B, of corresponding form. This furnace is constructed with a fire-grate, C, and chimney D, and there is an opening, *b b*, in the center of the said grate, corresponding in form with the opening C C, left within the solder-pan A, the said opening being surrounded with a tube, G H. This establishes a vent in communication with the atmosphere below the can or vessel, I, being soldered, within an inner margin, *d*, of the solder-pan, to allow of the expulsion of air when bringing down the can-joint into the melted solder, and to prevent the formation, below the bottom of the can, of a vacuum, which, if permitted to exist, would operate against the easy lifting of the can out of the solder-pan. This tube G H is shown as made in two pieces, of which the lower piece, G, is secured to the grate C, and the upper piece, H, is provided with a suitable handle, H′, and made movable, to enable fuel to be introduced into the furnace around the piece G.

The inner margin *d* of the solder-pan A is made to stand up sufficiently high to form a resting-place for the bottom or other part of the can or vessel I, and allow its joint *e* to dip to a suitable depth into the solder-pan, and to keep the said joint out of contact with the bottom of the said pan, in which the solder is always kept supplied to a suitable height to enable the joint to dip into it to a suitable depth, when the can or other vessel is resting upon the said margin *d*, said margin or other suitable rest also serving to completely protect the bottom, or that portion of the surface of the can in proximity to the joint, which does not require to be soldered, from contact with the solder. The bottom of the solder-pan is exposed to the direct heat of the fire in the furnace.

The process of soldering is extremely simple, as all that is required is to place the joint into the solder-pan, with the adjacent portion or portions of the can or other vessel resting upon the margin *d*, and to allow it to remain for a few seconds of time, which will be sufficient to allow the solder to penetrate into the joint.

The form of the trough or soldering-channel, however the same may be established within the pan, should correspond with the form of the joint to be soldered—as, for instance, for soldering on the tops and bottoms of circular vessels, the said trough or channel should be of annular form.

It is not here intended to claim any part of the construction of the furnace; but

What is claimed, and desired to be secured by Letters Patent, is—

1. In an apparatus in which the joint of any vessel is to be soldered by dipping, a pan provided with a soldering-channel of a form corresponding with that of the joint to be soldered, substantially as and for the purpose herein specified.

2. The soldering-pan constructed or provided with a resting-place for the can or vessel to be soldered, to regulate the depth to which the joint will enter the solder, and to protect the adjacent parts from contact with the latter, substantially as herein described.

3. Providing the pan or apparatus with a vent, in communication with the atmosphere, so arranged as to admit of the expulsion and free admission of air from below the can, within the space circumscribed by the rest, on which the can is made to bear in dipping the joint, essentially as herein set forth.

GEO. W. DEVOE,
*President of Devoe Manufacturing Company.*

FRED. W. DEVOE,
*Secretary and Treasurer of Devoe Man'g Co.*

Witnesses:
J. SEAVER PAGE,
GEO. W. BETTS.